March 31, 1925. 1,531,297
W. A. McCOY
ATTACHMENT FOR CORN SHELLER FEEDING ATTACHMENTS
Filed June 11, 1924
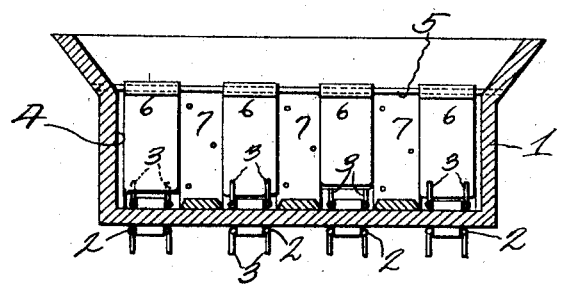
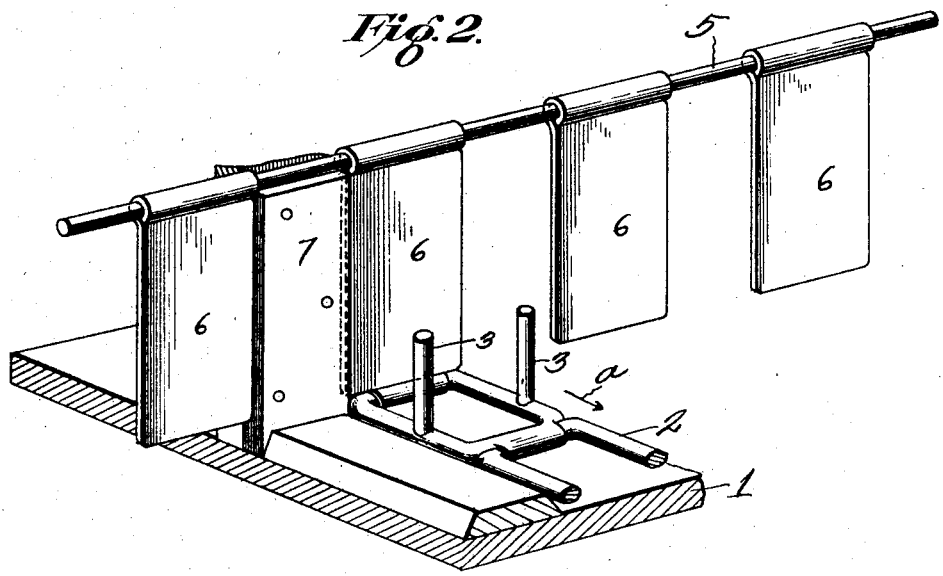
Inventor
W. A. McCoy
D. Swift
Attorney Patented Mar. 31, 1925.

1,531,297

UNITED STATES PATENT OFFICE.

WILLIAM A. McCOY, OF BLADEN, NEBRASKA.

ATTACHMENT FOR CORN-SHELLER-FEEDING ATTACHMENTS.

Application filed June 11, 1924. Serial No. 719,327.

*To all whom it may concern:*

Be it known that I, WILLIAM A. McCoy, a citizen of the United States, residing at Bladen, in the county of Webster, State of Nebraska, have invented a new and useful Attachment for Corn-Sheller-Feeding Attachments; and I do hereby declare the following to be a full, clear, and exact description of the invention, such as will enable others skilled in the art to which it appertains to make and use the same.

The invention relates to attachments for the lower end of the feeder of corn shelling machines, and has for its object to provide a device of this character which will keep the corn constantly moving in the lower end of the feeder and consequently said corn will be easily taken up by the conveyor chain and will also be prevented from lodging in the lower end of the feeder conveyor.

A further object is to provide pivotally mounted plates supported on a transversely disposed rod adjacent the lower end of the feeder conveyor, and which plates are positioned where their free ends will be in the path of the fingers carried by the conveyor chains and will be moved by the fingers of the conveyor chains thereby moving ears of corn at all times during the operation of the device, consequently insuring the taking up of the ears of corn by the conveyor chain, thereby preventing the ears of corn from lodging in the lower end of the feeder.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical transverse sectional view through a conventional form of corn sheller feeder conveyor showing the device applied thereto.

Figure 2 is a perspective view of the agitating device, showing the same adjacent a portion of the feeder conveyor.

Referring to the drawing, the numeral 1 designates a conventional form of corn sheller feeding conveyor, and 2 the endless feeder chains carried thereby, which chains move in the direction of the arrow *a* for feeding ears of corn to a corn shelling machine. The feeder chains 2 are provided with vertically disposed fingers 3, which fingers engage behind ears of corn and drag the same towards the corn shelling machine in the usual manner. It has been found that while feeding ears of corn to the conveyor, ears become lodged in the conveyor adjacent the end 4 thereof, and it is necessary to remove or break the jam manually. To obviate this difficulty the device is primarily designed. Extending transversely of the conveyor 1, adjacent the end 4 thereof is a rod 5, on which rod spaced downwardly extending plates 6 are pivotally mounted, and which plates register with the conveyor chains 2 whereby the fingers 3 carried thereby will engage the rear sides of the plates and incline them in the direction of travel of the chains 2; therefore it will be seen that said plates will engage ears of corn which may be lodged adjacent said plates and will move said ears whereby they will eventually be positioned where they will be dragged and conveyed by the conveyor chains 2 and the fingers 3 carried thereby. Disposed between the plates 6 are upwardly extending members 7, which members, in combination with the plates 6, maintain the ears of corn on the proper side of the plates 6 at all times. It will be noted that the plates 6 will be constantly moved during the movement of the conveyor chains 2, and the ears of corn will be constantly agitated, thereby preventing any ears of corn from becoming lodged adjacent the feeding end of the conveyor, as a whole and obviating the necessity of picking out the lodged ears and placing them where the conveyor chains will grip and feed the same.

From the above it will be seen that an agitating device is provided for a corn shelling feeding conveyor of a shelling machine, which device will constantly agitate corn adjacent the feeding end of the conveyor, thereby preventing lodging of ears of corn. It will also be seen that the plates are moved by the fingers of the conveyor chains, and the device as a whole may be easily and quickly applied to a feeding conveyor of a corn shelling machine without modifying the construction thereof.

The invention having been set forth what is claimed as new and useful is:—

The combination with a corn feeder conveyor of a corn shelling machine, a plurality of endless conveyor belts carried by said conveyor, upwardly extending fingers carried by said conveyor belts, of a plurality of spaced hingedly mounted plates above the conveyor belts, said plates being hingedly mounted on a transversely disposed rod, said plates having their free ends in the path of the fingers carried by the conveyor belts, and members interposed between the hingedly mounted plates and maintaining the same in spaced relation.

In testimony whereof I have signed my name to this specification in the presence of two subscribing witnesses.

W. A. McCOY.

Witnesses:
L. E. SPENCE,
HAROLD L. SPENCE.